S. TOTH.
WRENCH.
APPLICATION FILED FEB. 14, 1912.

1,070,559.

Patented Aug. 19, 1913.

Witnesses:
Sully Russo
Gladys Russell

Inventor
Steven Toth
By Lyon & Hackley
attys.

COLUMBIA PLANOGRAPH CO., WASHINGTON, D. C.

UNITED STATES PATENT OFFICE.

STEVEN TOTH, OF CORONA, CALIFORNIA.

WRENCH.

1,070,559.  Specification of Letters Patent.  Patented Aug. 19, 1913.

Application filed February 14, 1912. Serial No. 677,618.

*To all whom it may concern:*

Be it known that I, STEVEN TOTH, a citizen of the United States, residing at Corona, in the county of Riverside and State of California, have invented a new and useful Wrench, of which the following is a specification.

The main object of the invention is to provide a wrench which is capable of being used either as an ordinary wrench or as a pipe wrench, and which is of simple and strong construction, and convenient and effective in operation.

Other objects of the invention will appear hereinafter.

Figure 1:
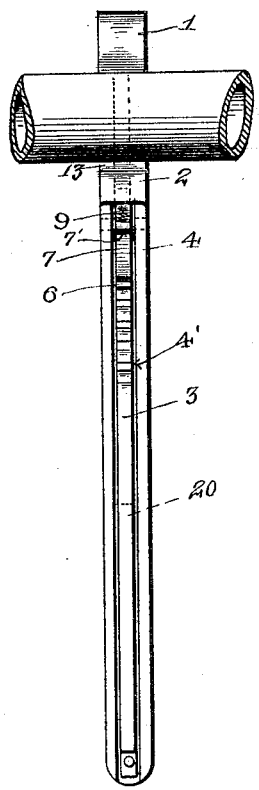
Figure 2:
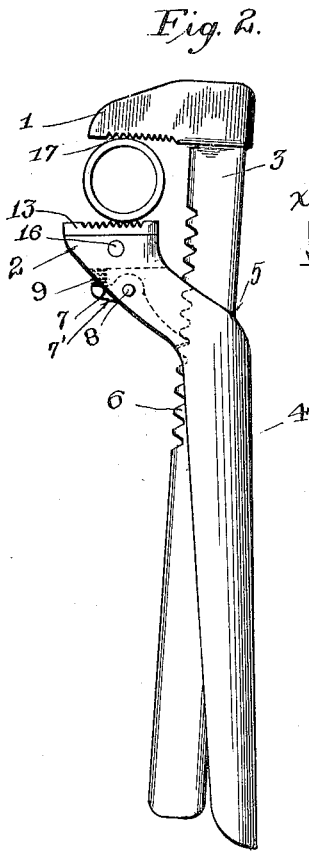
Figure 3:
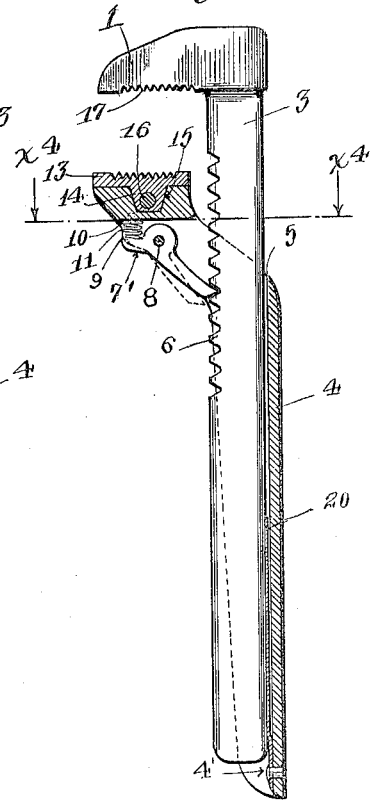
Figure 4:
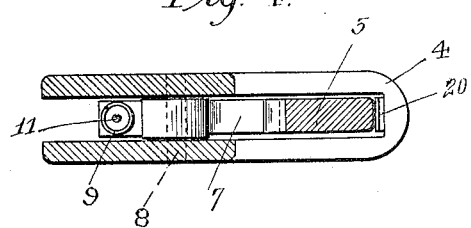

The accompanying drawings illustrate the invention, and referring thereto: Figure 1 is a front elevation of the wrench in position on a pipe. Fig. 2 is a side elevation thereof. Fig. 3 is a vertical section showing the position of the wrench for use as an ordinary or nut wrench, and showing in dotted lines, the position of the dog for releasing the wrench. Fig. 4 is a transverse section on line $x^4$—$x^4$ in Fig. 3.

The wrench comprises two jaw members 1 and 2, the outer jaw member 1 being provided with a shank 3 formed as a bar extending from the jaw 1, for example, at substantially right angles thereto, and the jaw member 2 being formed with a shank or handle portion 4, said jaw member 2 and its shank or handle portion 4 being formed integrally and said jaw member being offset from its shank and having an opening or slot 5 to receive the shank 3, so that the shank 4 is slidable longitudinally on the shank 3. The shank 3 passes loosely or with considerable clearance through the opening or slot 5, so that the two shanks 3 and 4 are movable angularly as well as longitudinally on one another. Shank 3 is provided with a series of teeth 6 forming a rack, and the jaw member 2 is provided with a dog for engaging said teeth, said dog consisting of a lever 7 pivoted at 8 to the jaw member 2 and having one arm adapted to engage at one end between the teeth 6 of the rack on the shank 3 and the other arm 7' of said lever, extending oppositely from the first named arm, being engaged by a spring 9 which engages with a shoulder 10 on the jaw member 2, said shoulder forming the upper wall of the opening or slot 5 in the jaw member 2, and being provided with a stud 11 extending within the spring 10 to retain the same in position. Dog lever 7 is contained within the slot in jaw member 2 and its arm 7' extends outside of said slot to enable manual operation of the dog lever to release the same. The teeth 6 on the shank 3 are V-shaped, the faces of each tooth being inclined from the base of the tooth toward the middle of the tooth at both sides of the tooth, so that in moving the jaw member 2 outwardly along the shank 3, the dog lever 7 will slip freely over said teeth and said dog may be disengaged from said teeth by pressing on the extension or outer portion 7' of said dog lever.

The jaw face of member 2 may be formed on a separable and renewable plate 13 having a projecting lug 14 seated in a recess 15 in the jaw member 2 and secured by a rivet 16. The jaw member 2 being formed as an integral body with its shank 4, gives a firm strong support for the removable jaw face plate 13. The operative faces of both the jaw members 1 and 2 are preferably serrated as shown at 17 and are straight and are so formed that when the handle or shank portion 4 for the jaw member 2, lies alongside and parallel to the shank 3 as shown in Fig. 3, the said jaw faces are parallel to one another and are adapted to engage a nut in the manner of an ordinary wrench. The shank or handle portion 4 is preferably longitudinally channeled as at 4' or made U-shaped so as to embrace and fit over the shank 3, said shank 3 being wider than the depth of the channel in the shank 4 so as to project therefrom in such manner that when the member 4 is closed on the member 3, the two parts will operate together as substantially a single handle adapted to be grasped by one hand so that the pressure with which said parts are grasped, tends to close the parts on one another. The jaw member 2 is offset from its shank 4, the slot 5 for receiving the shank being in this offset portion. A spring 20 on handle member 4 and housed within the U-shaped portion thereof engages shank 3 so as to tend to separate said parts.

The operation is as follows: In using the device as an ordinary wrench, the jaw member 2 is moved inwardly sufficiently to accommodate the nut or other object to be turned, this being effected by pressing with the thumb, for example, on the outer arm 7' of dog lever 7, so as to turn said dog or lever to position shown in dotted lines in Fig. 3, thereby removing the other end of said lever from the teeth 6 on the shank 3, whereupon the jaw member 2 may be slid bodily along the shank 3, the handle portion 4 of said jaw member sliding on said shank 3 so as to guide the jaw member 2 in its movement. This operation of the lever 7 with the thumb may be conveniently effected while the handle portion of the device is being grasped with one hand, the handle portion being held by the palm and fingers of the hand, while the thumb extends over the portion 7' of the lever 7. When the jaw members have been adjusted by this means to a sufficient distance apart to receive the nut, they are slipped over the nut and the lever 7 being released from the thumb, the latter springs to normal position by the operation of spring 9 so as to engage it with the rack teeth 6 and the jaw member 2 is then shoved along the shank 3 until the nut is firmly engaged between the jaw members 1 and 2, the dog 7 slipping along the rack and engaging with the rack teeth to hold the jaw member 2 firmly in tight adjustment against the nut. When the device is used for this purpose, the handle portion 4 lies close against the shank 3 and the two form substantially one handle member so that the wrench can be placed on the nut or withdrawn therefrom as conveniently as with an ordinary wrench. In using the device as a pipe wrench, the same operation is performed except that the jaw member 2 is engaged with the pipe while in an inclined or oblique position as shown in Fig. 2, the handle member 4 being relaxed in the grasp of the hand, so as to allow the spring 20 to slightly separate the members 4 and 3. On then shoving the jaw member 2 up against the pipe, and then grasping the members 4 and 3 firmly in the hand, the end of the lever 7 which engages with the rack teeth 6 acts as a fulcrum for the jaw member 2 and handle member 4, so that the compression of the members 4 and 3 in the hand, forces the jaw member 2 against the pipe and grips the pipe firmly between serrated surfaces of the jaw members 1 and 2, and this grip is tightened by the action of the jaws themselves when the handle portion of the device is moved to turn the pipe in the proper direction. To release the pipe it is only necessary to separate or allow separation of the handle member 4 from the shank member 3, for example, by turning the wrench backward around the pipe. In bringing the jaw member 2 toward the jaw member 1 for clamping the nut or pipe, it is unnecessary to use more than one hand since this movement of the jaw member 2 may be effected through any desired distance by grasping the two shanks 3 and 4 in one hand and repeatedly closing the fingers so as to move the shanks from the separated condition shown in Fig. 2, to the closed condition shown in Fig. 3, the handle spring 20 serving to separate the shanks after each of such closing movements. At each closing movement the dog 7 engages with the teeth 6 to push the jaw 2 forward one step, and on releasing the handle members they are sprung apart by the spring 20 and the detent then snaps forward one tooth under the action of its spring 9. If then it is desired to again separate the jaws this may be done without removing the hand from the handle members by simply pressing the handle members together in the palm of the hand and pressing the thumb against the outer arm of the detent lever. Thus both closing and opening operations may be performed by manipulation of the wrench with one hand.

What I claim is:

A wrench comprising an outer jaw member having a shank provided with teeth and an inner jaw member having a shank offset therefrom and extending at right angles to said jaw member and provided with a slot in the offset portion for receiving the shank on the outer jaw member, said inner jaw member and its shank being formed as an integral member, a face plate removably secured to said inner jaw member and provided with a straight face opposing the inner face of the outer jaw member, and a dog lever pivotally mounted on said inner jaw member within the slot thereof, and having one arm adapted to engage said teeth on said shank to hold the jaw members in set position and serve as a fulcrum, and said dog lever having another arm extending oppositely from said first named arm and projecting outside of the slot of the jaw member to enable the dog lever to be released from said teeth by pressure on said projecting portion, and a spring between said second arm of the dog lever and the inner jaw member for holding the first arm of the dog lever into engagement with the said teeth, said shank on the inner jaw member being channeled to partly inclose the said shank in the outer jaw member, and said shank on the outer member projecting from the channel in the shank of the inner jaw member when the shanks are closed on one another, and a spring between the shanks of said jaw members, tending to spread the shanks apart.

In testimony whereof, I have hereunto set my hand at Los Angeles, California, this 9th day of February, 1912.

STEVEN TOTH.

In presence of—
A. P. KNIGHT,
GLADYS RUSSELL.